Patented Feb. 3, 1931

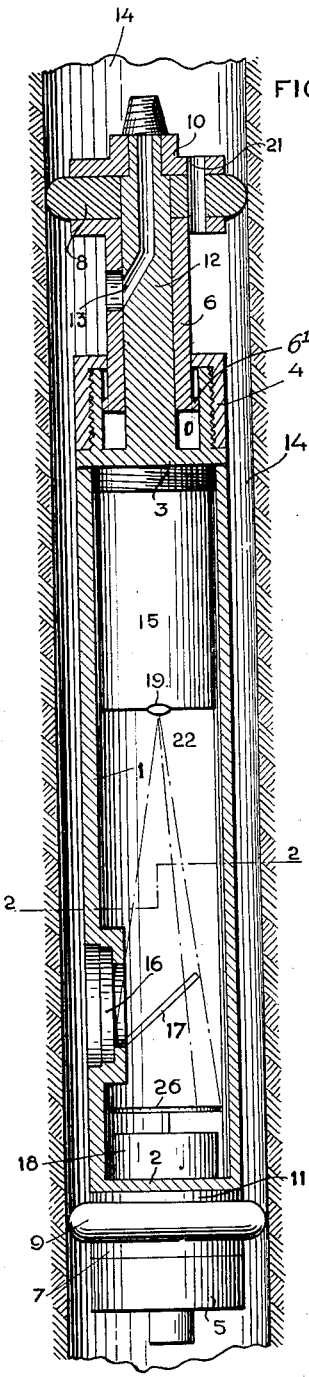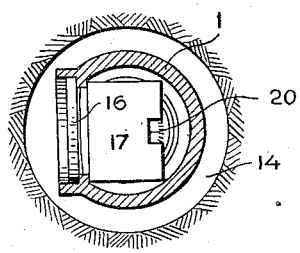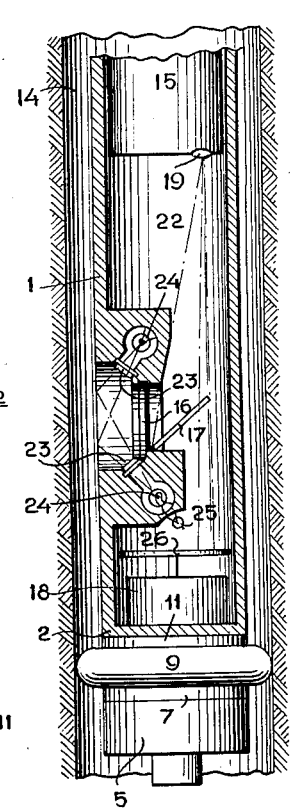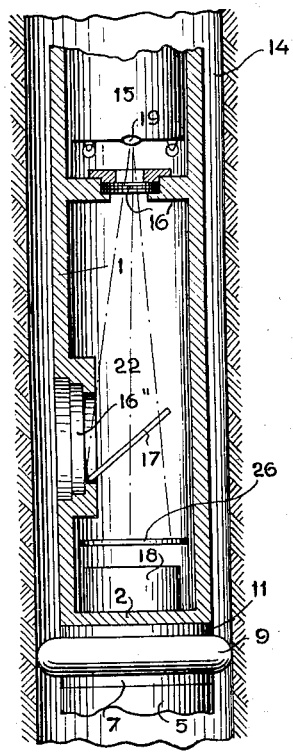

1,790,678

UNITED STATES PATENT OFFICE

THOMAS REINHOLD, OF HAARLEM, NETHERLANDS

APPARATUS FOR WASHING BOREHOLES

Original application filed March 20, 1924, Serial No. 700,729, and in the Netherlands March 29, 1923. Divided and this application filed January 11, 1928. Serial No. 246,029.

I have filed applications in the Netherlands on the 29th March, 1923 and 23rd July, 1923 and in Great Britain on the 25th March, 1924.

The present application is a division of my pending application No. 700,729 filed March 20th, 1924, for a stratigraphic measuring instrument and relates to apparatuses for washing bore holes for the purpose of enabling photographs to be taken therein of the kind in which a photographic camera is provided which is adapted to be lowered into the interior of a bore hole.

The principal object of the invention is to provide, in apparatuses of this kind, means for segregating a part of the bore hole within the range of the camera, and means for washing said part in order to enable clear photographs thereof to be taken.

Another object of the invention is to provide a supply of water under pressure for the purpose of effecting the washing operation.

A further object of the invention is to provide a photographic apparatus comprising a tubular casing adapted to be inserted into the bore hole and having the camera arranged within it, packing rings arranged at the upper and lower ends of the apparatus and adapted to seal the apparatus against the wall of the bore hole, and means for the admission and discharge of washing water into and from the space between said packing rings in order to cleanse this space and enable photographs to be taken therein.

Although the apparatus according to the present invention is intended primarily for use in conjunction with the apparatus described and claimed in my aforesaid pending application No. 700,729, which relates to a stratigraphic measuring instrument for simultaneously taking photographs of the interiors of bore holes and of compass indications showing the geographical orientation of said photographs, it will readily be understood that the present invention can also be employed in connection with any known type of apparatus for taking photographs of bore holes, of the kind in which a camera is lowered into the interior of the bore hole.

One construction of the apparatus embodying the features of the invention as applied to the aforesaid stratigraphic measuring instrument is illustrated by way of example in the accompanying drawings, in which:

Fig. 1 is a longitudinal section of the instrument and the bore hole;

Fig. 2 a cross section on line 2—2 of Fig. 1,

Fig. 3 a longitudinal section through a modified construction employing a horizontal closure device and Fig. 4 a longitudinal section illustrating a different arrangement of the electric lamps.

The apparatus forming the subject of the invention comprises a tubular casing 1 having a bottom 2 and adapted to be closed at the top end by means of a screw closure 3. Above the closure 3 and below the bottom 2 are provided cylindrical chambers 4 and 5 for the reception of pressure producing means. Piston rods 6 and 7 provided with pistons as indicated at 6' are adapted to move up and down through the covers or heads of the chamber 4 and 5, said piston rods 6 and 7 being adapted to exert pressure upon rubber packing rings 8 and 9 respectively which rest with their upper surfaces against stationary plates 10 and 11 respectively. The piston rods may be actuated by any suitable known means, for instance, by means of air pressure, gas pressure or other fluid pressure or by electrical or mechanical means. The upper rod 6 is guided in a cylindrical casing 12 and serves also for the admission of water, a water passage 13 being provided in the rod 6 which opens below the packing ring 8 and communicates with the annular space between the tubular casing 1 and the internal wall of the bore hole 14. Below the screw closure 3 and within the cylindrical chamber 22 of the casing is provided a photographic apparatus 15 the lens 19 of which is downwardly directed.

In the wall of the tubular casing 1 there is provided an opening closed in a watertight manner by a small transparent disc 16. An inclined mirror 17 is placed in the space 22 behind the disc 16. A magnetic or gyroscopic compass 18 is placed upon the bottom 2 of the casing 1. This compass is partly covered as regards the rays coming from the photographic apparatus by the mirror 17.

The disc 16 which in the construction shown is arranged in the vertical wall of the tubular casing 1 and closes hermetically the cylindrical space 22 against the bore hole 14, may as shown in Fig. 3 be arranged horizontally immediately below the lens 19 of the photographic apparatus. It will be seen that in Fig. 3 the disc 16' through which the rays pass may be very small and thus withstand very high pressures. In the construction of Fig. 3 the space 22 below the disc 16' is filled with water. The disc 16'' arranged in the vertical wall of the tubular casing 1 is not intended to effect a watertight closure and is therefore not subjected to high pressure. It may be made very thin and serves only for preventing the entrance of dirty water into the space 22. The water round the mirror 17 should be clear as otherwise it would detrimentally affect the action of the apparatus.

In the construction shown in Fig. 1 the wall of the bore hole is illuminated by electric incandescent lamps arranged inside the casing 1 laterally of the mirror 17. It is preferred, however, to arrange the source of light in the manner shown in Fig. 4. According to Fig. 4 the electric lamps 24 or other sources of light for illuminating the wall of the bore hole to be photographed throw the light through the watertight transparent closing discs 23. The reflected rays pass through the watertight closing disc 16 to the lens 19. In this manner detrimental reflection is avoided and the photographic views are much sharper than in the case in which both the direct and the reflected rays have to pass through the same disc 16. If electric lamps of a particular construction are used the discs 23 may be entirely dispensed with. In the construction shown in Fig. 4 the compass is illuminated by a separate lamp 25.

In the construction according to Fig. 3 in which the transparent closing disc 16' is arranged directly below the lens 19, the electric lamps are arranged between the lens 19 and the disc 16'.

The mirror 17 is provided at its upper edge with a cut-out portion 20 (see Fig. 2) through which the rays can pass from above to the compass card 26.

The operation is as follows:—

The instrument is lowered within the bore hole 14 to the required depth at which the direction and inclination of the various strata of the rock are to be ascertained. The means contained in the chambers 4 and 5 for producing pressure are then brought into action whereby the rods 6 and 7 are caused to compress the rubber packing rings 8 and 9. If desired the rings might be compressed by pressure water taken from the pipe which supplies the scavenging water during the drilling operation. The rings 8 and 9 are expanded by the pressure and are caused to lie tightly against the bore hole whereby the length of the bore hole 14 between the rings 8 and 9 is practically separated from the remaining length of the bore hole. After the length of the bore hole within which the photographic view is to be taken has thus been separated, clean scavenging or wash water is admitted by way of the passage 13 and the bore hole section 14 round the instrument is cleaned, the water escaping through a passage 21 provided in the ring 8 and the disc 10. When the water in the space 14 is sufficiently clean and clear so as not to impede the photographic operation, the electric lamps are switched in and the apparatus 15 is brought into action. In this manner a photographic view of the part of the bore hole wall visible through the disc 16 or 16'' is taken by the aid of the mirror 17. At the same time a part of the compass card visible through the cut-out portion 20 is taken upon the same plate. It will thus be seen that a view of a part of the bore hole is taken and at the same time a photographic record is made of the direction in which the view was taken. The photographic view gives the inclination of the various strata of the drilled rock, whilst the position of the compass card indicates the direction in which the strata extend.

If a series of such views is taken at definite angular positions of the instrument, exact information may be obtained as regards stratification of the rock, the inclination of the strata and the directions in which the strata runs.

I claim:

1. A photographic apparatus provided with a photographic camera adapted to be lowered into the interior of a bore hole for the purpose of taking photographs therein, comprising in combination: a tubular casing adapted to be inserted into the bore hole and having the camera arranged within it, a transparent window in said casing, packing rings arranged at the upper and lower ends of the apparatus, and means for the admission and discharge of washing water into and from the space between said packing rings and adjacent said window, substantially as described.

2. A photographic apparatus provided with a photographic camera adapted to be lowered into the interior of a bore hole for the purpose of taking photographs therein, comprising in combination: a tubular casing adapted to be inserted into the bore hole and having the camera arranged within it, a transparent window in said casing, packing rings arranged at the upper and lower ends of the apparatus, piston rods adapted to exert pressure on said packing rings, and means for the admission and discharge of washing water into and from the space between said packing rings and adjacent said window, substantially as described.

3. A photographic apparatus provided with a photographic camera adapted to be lowered into the interior of a bore hole for the purpose of taking photographs therein, comprising in combination: a tubular casing adapted to be inserted into the bore hole and having the camera arranged within it, a transparent window in said casing, packing rings arranged at the upper and lower ends of the apparatus, an inlet at the upper end of the apparatus for the admission of washing water into the space between said packing rings and adjacent said window, and an outlet at the upper end of the apparatus for the discharge of the washing water from the aforesaid space.

Signed at Amsterdam, Netherlands, this 15th day of December, 1927.

TH. REINHOLD.